United States Patent
Stabenow

(10) Patent No.: US 9,199,524 B2
(45) Date of Patent: Dec. 1, 2015

(54) VEHICLE AIR SUSPENSION SYSTEM AND CONTROL METHOD

(71) Applicant: WABCO GmbH, Hannover (DE)

(72) Inventor: Uwe Stabenow, Laatzen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/355,647

(22) PCT Filed: Nov. 20, 2012

(86) PCT No.: PCT/EP2012/004810
§ 371 (c)(1),
(2) Date: May 1, 2014

(87) PCT Pub. No.: WO2013/091758
PCT Pub. Date: Jun. 27, 2013

(65) Prior Publication Data
US 2014/0312590 A1  Oct. 23, 2014

(30) Foreign Application Priority Data
Dec. 21, 2011 (DE) .......................... 10 2011 121 756

(51) Int. Cl.
*B60G 17/056* (2006.01)
*B60G 17/052* (2006.01)

(52) U.S. Cl.
CPC ........ *B60G 17/0565* (2013.01); *B60G 17/0525* (2013.01); *B60G 17/0528* (2013.01); *B60G 2202/152* (2013.01); *B60G 2500/2021* (2013.01); *B60G 2500/302* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,466,007 | A | * | 11/1995 | Smith | 280/6.157 |
| 5,467,595 | A | * | 11/1995 | Smith | 60/410 |
| 6,332,623 | B1 | * | 12/2001 | Behmenburg et al. | 280/124.16 |
| 6,726,224 | B2 | * | 4/2004 | Jurr et al. | 280/5.514 |
| 6,752,402 | B2 | * | 6/2004 | Grotendorst et al. | 280/6.152 |
| 6,817,600 | B2 | * | 11/2004 | Ocker et al. | 267/274 |
| 7,441,789 | B2 | * | 10/2008 | Geiger et al. | 280/124.16 |
| 7,552,932 | B2 | * | 6/2009 | Matern et al. | 280/124.16 |
| 8,777,246 | B2 | * | 7/2014 | Meier | 280/124.16 |
| 8,814,190 | B2 | * | 8/2014 | Becher et al. | 280/124.16 |

(Continued)

FOREIGN PATENT DOCUMENTS

DE 42 43 577 B4 6/1994
DE 198 33 491 C2 2/2000

(Continued)

*Primary Examiner* — Nicole Verley
(74) *Attorney, Agent, or Firm* — Kramer Levin Naftalis & Frankel LLP

(57) ABSTRACT

A vehicle air suspension system includes one or more bellows assigned to an air spring of one or more vehicle axles. The bellows can be connected to a main pressure line and can be blocked off therefrom via a connecting line having a level control valve. The main line can be supplied with air via a supply line having a compressor and an air dryer, and can be vented via a vent line, which branches off between the compressor and the air dryer and has a discharge valve. A pressure reservoir can be connected to the main line and can be blocked off therefrom via a connecting line having a storage valve. To set different flow velocities when supplying and venting the bellows, the bellows of the air spring arranged on a vehicle axle or on a vehicle side is/are connected to the main line and blocked off therefrom via at least two parallel connecting lines, each having a level control valve.

5 Claims, 4 Drawing Sheets

(56) References Cited

U.S. PATENT DOCUMENTS

| | | | |
|---|---|---|---|
| 8,899,598 B2* | 12/2014 | Frank et al. | 280/5.514 |
| 9,010,785 B2* | 4/2015 | Gocz et al. | 280/124.16 |
| 9,062,571 B2* | 6/2015 | Frank et al. | |
| 2006/0006733 A1* | 1/2006 | Geiger et al. | 303/3 |
| 2008/0111337 A1 | 5/2008 | Suzuki et al. | |
| 2013/0255240 A1* | 10/2013 | Bergemann et al. | 60/327 |
| 2013/0257007 A1* | 10/2013 | Frank et al. | 280/124.161 |
| 2013/0318954 A1* | 12/2013 | Frank et al. | 60/407 |
| 2015/0151602 A1* | 6/2015 | Suzuki et al. | B60G 17/056 |
| 2015/0151603 A1* | 6/2015 | Kondo et al. | B60G 17/056 |

FOREIGN PATENT DOCUMENTS

| | | |
|---|---|---|
| DE | 199 44 873 C1 | 1/2001 |
| DE | 100 04 880 A1 | 8/2001 |
| DE | 102 23 405 B4 | 2/2003 |
| KR | 101 041 554 B1 | 6/2011 |

* cited by examiner

VEHICLE AIR SUSPENSION SYSTEM AND CONTROL METHOD

FIELD OF THE INVENTION

The present invention generally relates to an air suspension system of a motor vehicle, and to a method for controlling an air suspension system when supplying air to and venting air from the spring bellows of air springs.

BACKGROUND OF THE INVENTION

Compared with conventional steel spring systems, air suspension systems have significant advantages and are therefore increasingly being used both on commercial vehicles, such as trucks and buses, and on heavy, passenger vehicles, such as luxury limousines and SUVs. Thus, an air suspension system allows level control independently of load since the current load state can, in each case, be compensated for by adapting the bellows pressure in the spring bellows of the air springs. By virtue of the progressive spring characteristics of the air springs, an air suspension system likewise offers particularly reliable road contact for the wheels and a comfortable response during outward and inward deflection of the wheels. Another advantage of air suspension systems is that the ground clearance of the vehicles can be modified if required, e.g., increased for off-road use and reduced for high-speed travel on freeways.

In the case of commercial vehicles, there is also the fact that the vehicle body can be lowered or adjusted to a suitable height for loading and unloading. Thus, for example, the vehicle chassis of an air-sprung truck or trailer can be lowered to set down an interchangeable body and raised again to pick it up. It is likewise possible for the loading surface of a truck to be adjusted to the level of a loading ramp by lowering or increasing the bellows pressure at the rear axle to facilitate loading and unloading. In the case of air-sprung buses, the vehicle body on the nearside can be lowered by releasing the compressed air from the spring bellows on the nearside to make it easier for the passengers to get in and out; and it can then be raised again by filling the spring bellows.

The fundamental construction of an air suspension system of the general type under consideration is known from DE 198 33 491 C2 and DE 100 04 880 A1, for example.

The air suspension system described in DE 198 33 491 C2 has a plurality of spring bellows, which can be connected to a main pressure line and blocked off with respect thereto via connecting lines, each provided with a level control valve. The level control valves are each designed as 2/2-way solenoid switching valves, which, in a first position (rest position), are closed and, in a second position (actuated position), are open. The main pressure line can be supplied with air via a supply line provided with a compressor, an air dryer and a check valve, and can be vented via a vent line that branches off between the compressor and the air dryer and is provided with a discharge valve. The discharge valve is designed as a pressure-controlled 2/2-way switching valve, which, in a first position (rest position), is closed and, in a second position (actuated position), is open. The pilot control valve assigned to the discharge valve is designed as a 3/2-way solenoid switching valve, which, in a first position (rest position), connects the control line leading to the discharge valve to the environment and, in a second position (actuated position), connects it to the main pressure line. In a first embodiment of this known air suspension system, a throttle valve designed as a pressure-controlled 2/2-way switching valve is arranged in a line segment parallel to the check valve, which throttle valve is closed in a first position (rest position) and open in a second position (actuated position) with a throttling cross-sectional area, and the pneumatic control input of which is connected to the control line of the discharge valve. The throttle valve is thus opened by the pilot control valve when air is being supplied to the main pressure line, as is the discharge valve, wherein the throttling cross-sectional area limits the air mass flow and expands it ahead of the air dryer, thereby increasing moisture absorption by the compressed air from the air dryer and thus improving the regeneration thereof. In a second embodiment of this known air suspension system, the discharge valve and the throttle valve are combined in a common pressure-controlled 4/2-way switching valve.

The air suspension system according to DE 100 04 880 A1 differs from the foregoing prior art in that a check valve is arranged between the compressor and the air dryer and, instead of the check valve and of the throttle valve connected in parallel, a restrictor is arranged after the dryer in the supply line in the direction of air supply. Moreover, the discharge valve now has a pressure limiting function and a check valve, which is activated in the second position (actuated position). The air suspension system according to DE 100 04 880 A1 also has a pressure reservoir, which can be connected to the main pressure line and blocked off with respect thereto by means of a connecting line provided with a reservoir valve. In a first embodiment of this known air suspension system, a high-pressure discharge valve is additionally provided, the valve being designed as a 2/2-way solenoid switching valve, by means of which compressed air can be discharged into the environment from the main pressure line when required while bypassing the air dryer. In a second embodiment of this known air suspension system, a throttle valve with a controllable throttling cross-sectional area, by means of which the air mass flow flowing out into the environment when spring bellows are vented can be limited and hence the lowering speed of the vehicle body can be controlled, e.g., at one vehicle axle or on one vehicle side, is arranged after the discharge valve in the venting direction.

DE 42 43 577 B4, in contrast, describes an air suspension system of a motor vehicle in which a first control valve, which is designed as a 3/2-way solenoid switching valve and by means of which a plurality of connecting lines, each provided with a level control valve and leading to the spring bellows of an associated air spring, can be connected to a pressure source, such as a pressure reservoir, or a pressure sink, e.g., the environment, has a second control valve designed as a 2/2-way solenoid switching valve arranged after it in the direction of air supply. In a first position (rest position), this second control valve is open without throttling and, in a second position (actuated position), it is open with a throttling cross-sectional area. By actuating the second control valve, this known air suspension system can thus be switched between rapid air admission to and venting of the spring bellows and slow air admission to and venting of the spring bellows. However, the throttle of the second control valve can only be used for a certain number of spring bellows, i.e., for slow air admission to and venting of two or four spring bellows for example.

Finally, DE 102 23 405 B4 discloses an air suspension system of a motor vehicle, which corresponds substantially to that described in DE 198 33 491 C2 but in which, as in the air suspension system according to DE 100 04 880 A1, a pressure reservoir is provided that can be connected to the main pressure line and blocked off with respect thereto via a connecting line provided with a reservoir valve. A first embodiment of this known air suspension system differs therefrom in that the discharge valve is designed as a 2/2-way solenoid switching valve and a throttle valve with a controllable throttling cross-sectional area is arranged in the line segment parallel to the restrictor instead of a switching valve provided in one position with a constant throttling cross section. By virtue of the limited adjustment of the throttling cross-sectional area that is possible, the air mass flow flowing in or out via the air dryer when supplying air to and venting air from spring bellows can be regulated, and hence the raising and lowering speed of the vehicle body can be controlled zone by zone, e.g., at the relevant vehicle axle or the vehicle side. However, a throttle valve with a controllable throttling cross-sectional area is a complex component, the production of which is an involved process and which is correspondingly expensive and fault prone.

A problem with conventional air suspension systems is inadequate control or variation of the air mass flow when supplying air to and venting air from the spring bellows, and hence of the raising and lowering speed of the vehicle body. Whereas only relatively low air mass flows are required during the level control function and to compensate for leakage losses, relatively large air mass flows must be directed into the relevant spring bellows or released therefrom to lower and raise the vehicle body quickly. With the air suspension systems known hitherto, this is possible either only to an inadequate extent and in conjunction with functional disadvantages or functional limitations or only with high expenditure in terms of equipment.

SUMMARY OF THE INVENTION

Generally speaking, it is an object of the present invention to provide a vehicle air suspension system of the general type under consideration in which setting different flow rates of the air mass flow when supplying air to and venting air from the spring bellows of air springs can be achieved in a simple and low-cost manner. It is also an object to provide a method for controlling an air suspension system when supplying air to and venting air from the spring bellows of air springs.

According to embodiments of the present invention, the objects of the invention can be achieved by connecting at least one spring bellows of the air spring arranged at least at one vehicle axle or on one vehicle side to the main pressure line and blocking it off via at least two parallel connecting lines, each provided with a level control valve.

The starting point for embodiments of the present invention is an air suspension system known per se in a motor vehicle, having at least one spring bellows assigned to an air spring of at least one vehicle axle. The spring bellows can be connected to a main pressure line and can be blocked off with respect thereto via a connecting line provided with a level control valve, and the main pressure line can be supplied with air via a supply line having a compressor and an air dryer, and vented via a vent line that branches off between the compressor and the air dryer and includes a discharge valve. A pressure reservoir is optionally provided, which can be connected to the main pressure line and blocked off with respect thereto via a connecting line provided with a reservoir valve.

In order to be able to set different air mass flows and hence different raising and lowering speeds of the vehicle body at the relevant vehicle axle or on the relevant vehicle side in a simple and low-cost manner when supplying air to and venting air from the spring bellows of air springs in an air suspension system of this kind, the spring bellows of the air spring arranged at least at one vehicle axle or on one vehicle side, or ideally, the spring bellows of all the air springs present, should no longer, as hitherto customary, be connectable to the main pressure line or blocked off therefrom in each case via a single connecting line provided with a level control valve. On the contrary, according to embodiments of the present invention, the spring bellows of the air spring arranged at least at one vehicle axle or on one vehicle side, that is, ideally the spring bellows of all air springs present, can be connected to the main pressure line and blocked off with respect thereto via at least two substantially parallel connecting lines, each provided with a level control valve.

The air mass flow flowing to or from a spring bellows of an air spring can thus be controlled in a simple manner in at least two stages by opening just one of the two level control valves or both level control valves. The level control valves are generally 2/2-way solenoid switching valves, which are nowadays produced in large numbers and can be obtained at a correspondingly low cost. Compressed air lines do not represent a significant cost factor either.

Fitting the spring bellows of air springs of a motor vehicle with connecting lines and level control valves arranged in parallel does not necessarily have to be implemented at all the air springs. On the contrary, it is expedient to fit therewith only the spring bellows of those air springs at which different raising and lowering speeds of the vehicle body are actually required, e.g., on a truck with a fixed body, only at the air springs of the rear axle in order to adjust the edge of the loading surface during loading and unloading and, on a bus, only at the nearside air springs for rapid lowering and raising of the entrances at stops.

The at least two level control valves of the relevant spring bellows can have nozzle cross-sectional areas of the same size. In this case, the level control valves can be identical in construction. This means that the nominal sizes $NW_X$, $NW_Y$ of the respective nozzle cross-sectional areas of the relevant level control valves are identical ($NW_X = NW_Y$). The use of level control valves of identical construction results in cost advantages in the procurement thereof and in logistics. Mixing up level control valves during assembly and during subsequent repairs to the air suspension system is thereby likewise avoided. By opening one of the two level control valves and both level control valves, it is thus possible effectively to open up two nozzle cross-sectional areas per spring bellows.

As an alternative to this, however, it is also possible for the level control valves of the relevant spring bellows to have nozzle cross-sectional areas of different sizes. This means that the nominal size $NW_X$ of one level control valve is greater than the nominal size $NW_Y$ of the other level control valve assigned to the same spring bellows ($NW_X > NW_Y$). The disadvantage of slightly higher costs for procurement and logistics is balanced by the advantage that, in this case, a total of three nozzle cross-sectional areas per spring bellows can be opened up by opening in each case one of the two level control valves and both level control valves.

To reduce the effort involved in assembly, at least the two level control valves assigned to the spring bellows of a single air spring can be arranged in a common valve block. In this case, a dual valve block would thus be used. Of course, however, it is also possible for the level control valves assigned to the spring bellows of several air springs to be combined in a common valve block. Thus, it is advantageous if the four level control valves assigned to the two spring bellows of the two air springs of one vehicle axle for example are arranged in a common quadruple valve block or, including the reservoir valve of a pressure reservoir arranged in the vicinity of the vehicle axle, are arranged in a common quintuple valve block.

In order to improve the dehumidification of the compressed air in the air dryer when supplying air to the main pressure line and to improve regeneration of the air dryer when venting the main pressure line, a restrictor can be arranged downstream of the air dryer in the direction of air supply. To ensure that this restrictor does not impair the control of the respective air mass flow via the level control valves, however, the cross-sectional area of this restrictor is greater than the sum of the nozzle cross-sectional areas of all the level control valves. This condition is met when the equation $NW_Z > (n_{FB} * (NW_X^2 + NW_Y^2))^{0.5}$ is satisfied, wherein $NW_X$ denotes the nominal size of the first level control valves, $NW_Y$ denotes the nominal size of the second level control valves, $NW_Z$ denotes the nominal size of the restrictor and $n_{FB}$ denotes the number of spring bellows. If the first level control valves have a nominal size of $NW_X = 2.0$ mm, the second level control valves have a nominal size of $NW_Y = 1.7$ mm, and two spring bellows of air springs arranged at one vehicle axle are present ($n_{FB} = 2$), for example, the nominal size of the restrictor $NW_Z$ should therefore be greater than 3.7 mm ($NW_Z > 3.7$ mm) in order to avoid unwanted restriction of the air mass flow at the restrictor.

To control an air suspension system of a motor vehicle when supplying air to and venting air from at least one spring bellows, which is assigned at least to the air spring arranged at one vehicle axle or at least on one vehicle side and can be connected to a main pressure line and blocked off with respect thereto in each case via two parallel connecting lines, each provided with a level control valve, when the two level control valves of the relevant spring bellows have nozzle cross-sectional areas of the same size ($NW_X = NW_Y$), in each case one of the two level control valves of the relevant spring bellows is opened to achieve slow lowering or raising of the vehicle body at at least one of the vehicle axles or on at least one vehicle side. And, when lowering or raising the vehicle body quickly at at least one of the vehicle axles or on at least one vehicle side, in each case both level control valves of the relevant spring bellows are opened.

When the two level control valves of the relevant spring bellows have nozzle cross-sectional areas of different sizes ($NW_X > NW_Y$), in each case that level control valve of the relevant spring bellows that has the smaller nozzle cross-sectional area ($NW_Y$) is opened when lowering or raising the vehicle body slowly at at least one of the vehicle axles or on at least one vehicle side. When lowering or raising the vehicle body at at least one of the vehicle axles or on at least one vehicle side with a moderate speed of adjustment, in each case that level control valve of the relevant spring bellows that has the larger nozzle cross-sectional area ($NW_X$) is opened. And, when lowering or raising the vehicle body quickly at at least one of the vehicle axles or on at least one vehicle side, in each case both level control valves of the relevant spring bellows are opened.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is discussed in greater detail below with reference to the accompanying drawings in which.

Figure 1:
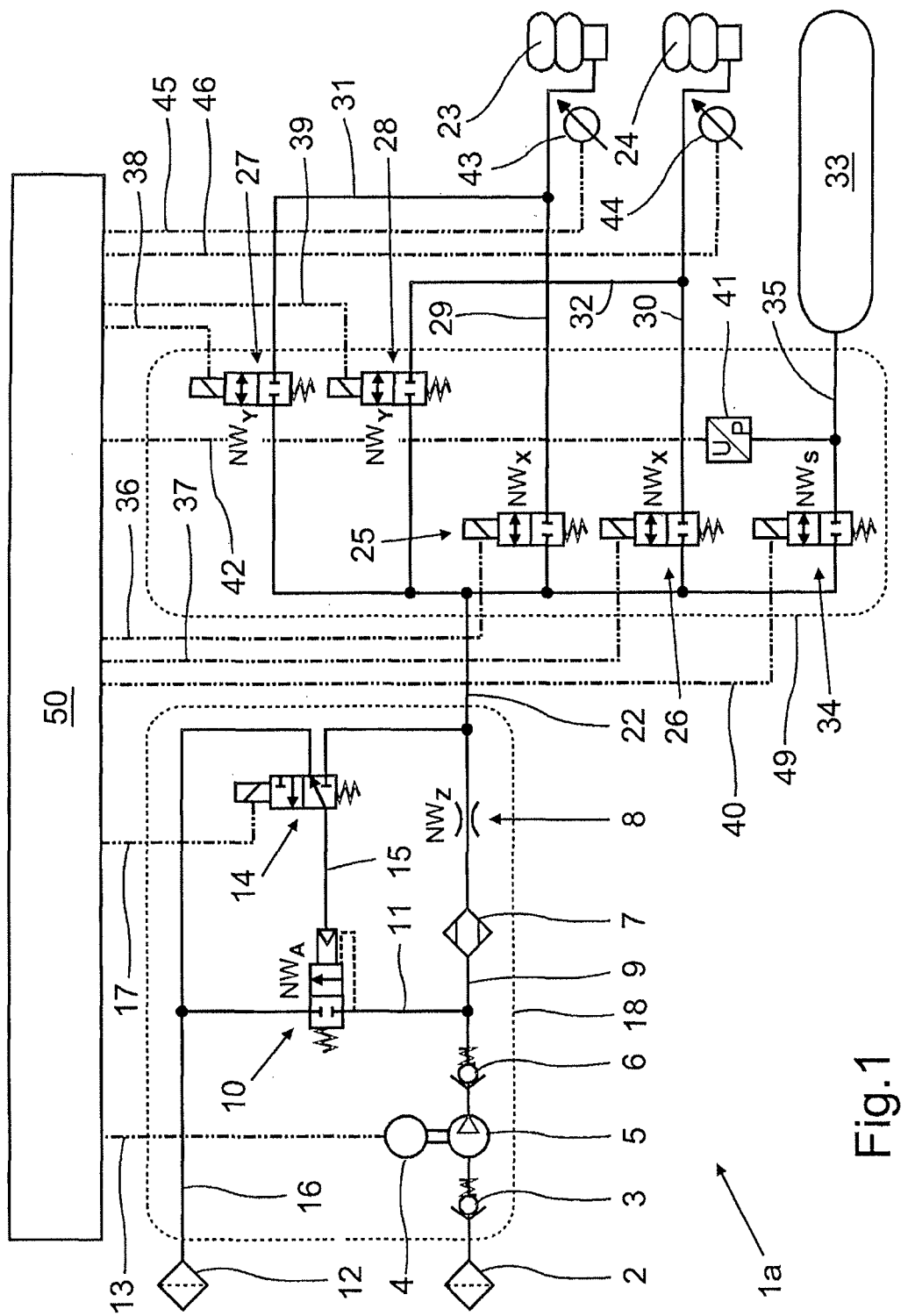
FIG. 1 shows a vehicle air suspension system according to a first embodiment of the present invention.

LIST OF REFERENCE CHARACTERS 1a-1d air suspension system
2 first filter
3 first check valve
4 electric motor
5 compressor
6 second check valve
7 air dryer
8 restrictor
9 supply line
10 discharge valve
11 vent line
12 second filter
13 electric control line
14 pilot control valve
15 pneumatic control line
16 unpressurized segment
17 electrical control line
18 compressor module
19 rapid discharge valve
20 rapid vent line
21 electrical control line
22 main pressure line
23 spring bellows
24 spring bellows
25 first level control valve for spring bellows 23
26 first level control valve for spring bellows 24
27 second level control valve for spring bellows 23
28 second level control valve for spring bellows 24
29 first connecting line for spring bellows 23
30 first connecting line for spring bellows 24
31 second connecting line for spring bellows 23
32 second connecting line for spring bellows 24
33 pressure reservoir
34 reservoir valve
35 connecting line
36 electrical control line
37 electrical control line
38 electrical control line
39 electrical control line
40 electrical control line
41 pressure sensor
42 sensor line
43 displacement sensor
44 displacement sensor
45 sensor line
46 sensor line
47 triple valve block
48 quadruple valve block
49 quintuple valve block
50 control unit
nFB number of spring bellows
NWA nozzle cross-sectional area of discharge valve 10
NWS nozzle cross-sectional area of reservoir valve 34
NWX nozzle cross-sectional area of level control valve 25, 26
NWY nozzle cross-sectional area of level control valve 27, 28
NWZ nozzle cross-sectional area of restrictor 8

DETAILED DESCRIPTION OF THE PREFERRED EMBODIMENTS

Figure 3:
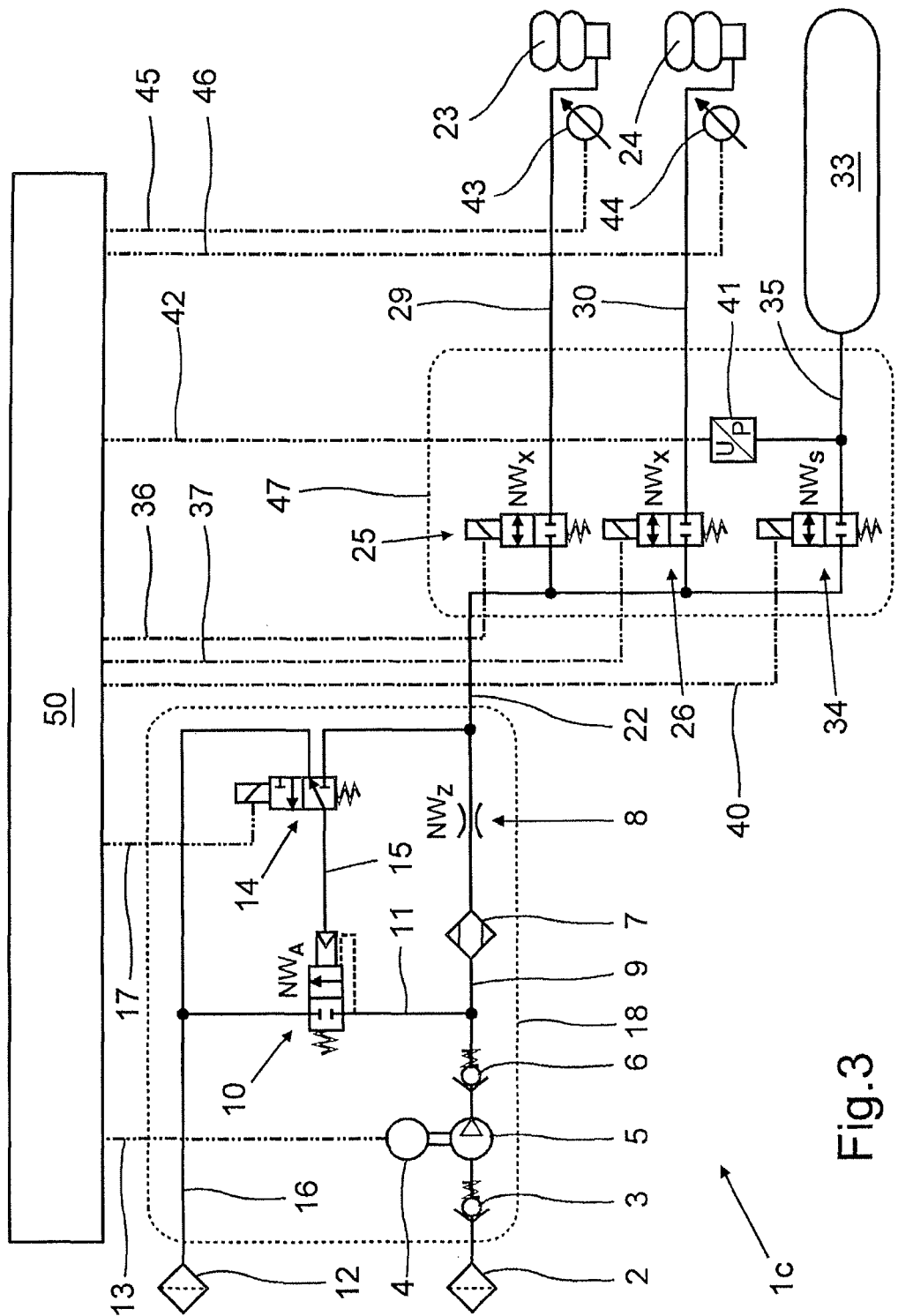
FIG. 3 shows a known first air suspension system of a motor vehicle.

By way of example, a known air suspension system 1c of a motor vehicle, which is illustrated in FIG. 3, has two spring bellows 23, 24, which are assigned to the two air springs of a vehicle axle and can each be connected to a main pressure line 22 and blocked off with respect thereto via connecting lines 29, 30, each provided with a level control valve 25, 26. The level control valves 25, 26 are designed as 2/2-way solenoid switching valves, which, in a first position (rest position), are closed and, in a second position (actuated position), are in each case open with a nozzle cross-sectional area of nominal size $NW_X$. There is furthermore a pressure reservoir 33, which can be connected to the main pressure line 22 and blocked off with respect thereto via a connecting line 35 provided with a reservoir valve 34. The reservoir valve 34 is designed as a 2/2-way solenoid switching valve, which, in a first position (rest position), is closed and, in a second position (actuated position), is open with a nozzle cross-sectional area of nominal size $NW_S$.

The electromagnets of the two level control valves 25, 26 and of the reservoir valve 34 are connected to an electronic control unit 50 by associated electrical control lines 36, 37, 40. A pressure sensor 41 for detecting the reservoir pressure prevailing in the pressure reservoir 33 is connected to the pneumatic connecting line 35 between the pressure reservoir 33 and the reservoir valve 34, being connected to the control unit 50 by a sensor line 42. Arranged close to the air springs having the spring bellows 23, 24 are respective displacement sensors 43, 44 for detecting the body level in the region of the relevant vehicle axle, the sensors being connected to the control unit 50 by respective sensor lines 45, 46. In the present case, the two level control valves 25, 26, the reservoir valve 34 and the pressure sensor 41 are arranged in a triple valve block 47 by way of example.

The main pressure line 22 can be supplied with air via a supply line 9 provided with a first filter 2 arranged at the inlet end, a first check valve 3, a compressor 5, which can be driven by an electric motor 4, a second check valve 6, an air dryer 7 and a restrictor 8 arranged thereafter in the direction of air supply and having a throttling cross-sectional area of nominal size $NW_Z$. The main pressure line 22 can furthermore be vented via a vent line 11 branching off between the second check valve 6 and the air dryer 7, provided with a discharge valve 10 and having a second filter 12 arranged at the end and also acting as a muffler.

The electric motor 4 of the compressor 5 is connected to a power supply and, via an electrical control line 13, to the control unit 50. The discharge valve 10 is designed as a pressure-controlled 2/2-way switching valve having a nozzle cross-sectional area of nominal size $NW_A$, which is closed in a first position (rest position) and open in a second position (actuated position), and which has a pressure limiting function for the pressure prevailing in the supply line 9. An electromagnetically operating discharge valve can also be used instead of the pneumatically controlled discharge valve 10.

The pilot control valve 14 assigned to the discharge valve 10 is designed as a 3/2-way solenoid switching valve, which, in a first position (rest position), connects the pneumatic control line 15 leading to the discharge valve 10 to the permanently unpressurized segment 16 of the vent line 11 and, in a second position (actuated position), connects it to the main pressure line 22. The electromagnet of the pilot control valve 14 is connected to the control unit 50 by an electrical control line 17. In the present case, the two check valves 3 and 6, the compressor 5 with the associated electric motor 4, the air dryer 7, the restrictor 8 and the discharge valve 10 with the associated pilot control valve 14 are combined in a compressor module 18 by way of example.

The spring bellows 23, 24 can be supplied with air by means of the compressor 5, from the pressure reservoir 33 or simultaneously from both pressure sources. If the spring bellows 23, 24 are supplied with air by means of the compressor 5, the compressor is driven by the electric motor 4 and delivers compressed air through the supply line 9 into the main pressure line 22 from the environment via the filter 2, the two check valves 3 and 6, the air dryer 7 and the restrictor 8. As it flows through the air dryer 7, which preferably contains silicate granules that can be regenerated, the compressed air is dehumidified, this being promoted by the pressure rise ahead of the restrictor 8. From the main pressure line 22, the compressed air flows via the connecting lines 29, 30 and the open level control valves 25, 26 into the spring bellows 23, 24.

When the spring bellows 23, 24 are supplied with air from the pressure reservoir 33, the compressed air stored there under high pressure flows via the connecting line 35 and the open reservoir valve 34 into the main pressure line 22 and, from there, into the spring bellows 23, 24 via the connecting lines 29, 30 and the open level control valves 25, 26.

When the spring bellows 23, 24 are vented, the compressed air flows out of the spring bellows 23, 24, via the connecting lines 29, 30 and the open level control valves 25, 26, into the main pressure line 22 and, from there, into the environment via the restrictor 8, the air dryer 7, the vent line 11, the open discharge valve 10 and the filter 12, which also acts as a muffler. As the previously dried compressed air flows through the air dryer 7, it absorbs moisture from the silicate granules, and the air dryer 7 is thereby regenerated. Regeneration of the air dryer 7 is promoted by the pressure drop in the compressed air across the restrictor 8.

Opening of the discharge valve 10 is accomplished by connecting the associated pneumatic control line 15, which is connected to the permanently unpressurized segment 16 of the vent line 11 in the unactuated state of the pilot control valve 14, to the pressurized main pressure line 22 by switching over the pilot control valve 14. Thus, the discharge valve 10 remains open until the pressure prevailing in the main pressure line 22 falls below a minimum or the pilot control valve 14 is switched over to the rest position.

From the construction and functional description of the known air suspension system 1c shown in FIG. 3, it can be seen that the air mass flow during the supply of air to and venting of air from the spring bellows 23, 24 and hence the speed of adjustment when raising and lowering the vehicle body at the relevant vehicle axle is controlled only inadequately, i.e., is inadequately adjustable in height. While the air mass flow during the supply of air to the spring bellows 23, 24 can be influenced to a limited extent by the pressure set in the main pressure line 22, the air mass flow during the venting of the spring bellows 23, 24 automatically results essentially from the pressure prevailing in the spring bellows 23, 24 and the flow resistance of the level control valves 25, 26, the restrictor 8, the air dryer 7, the discharge valve 10 and the filter 12.

Figure 4:
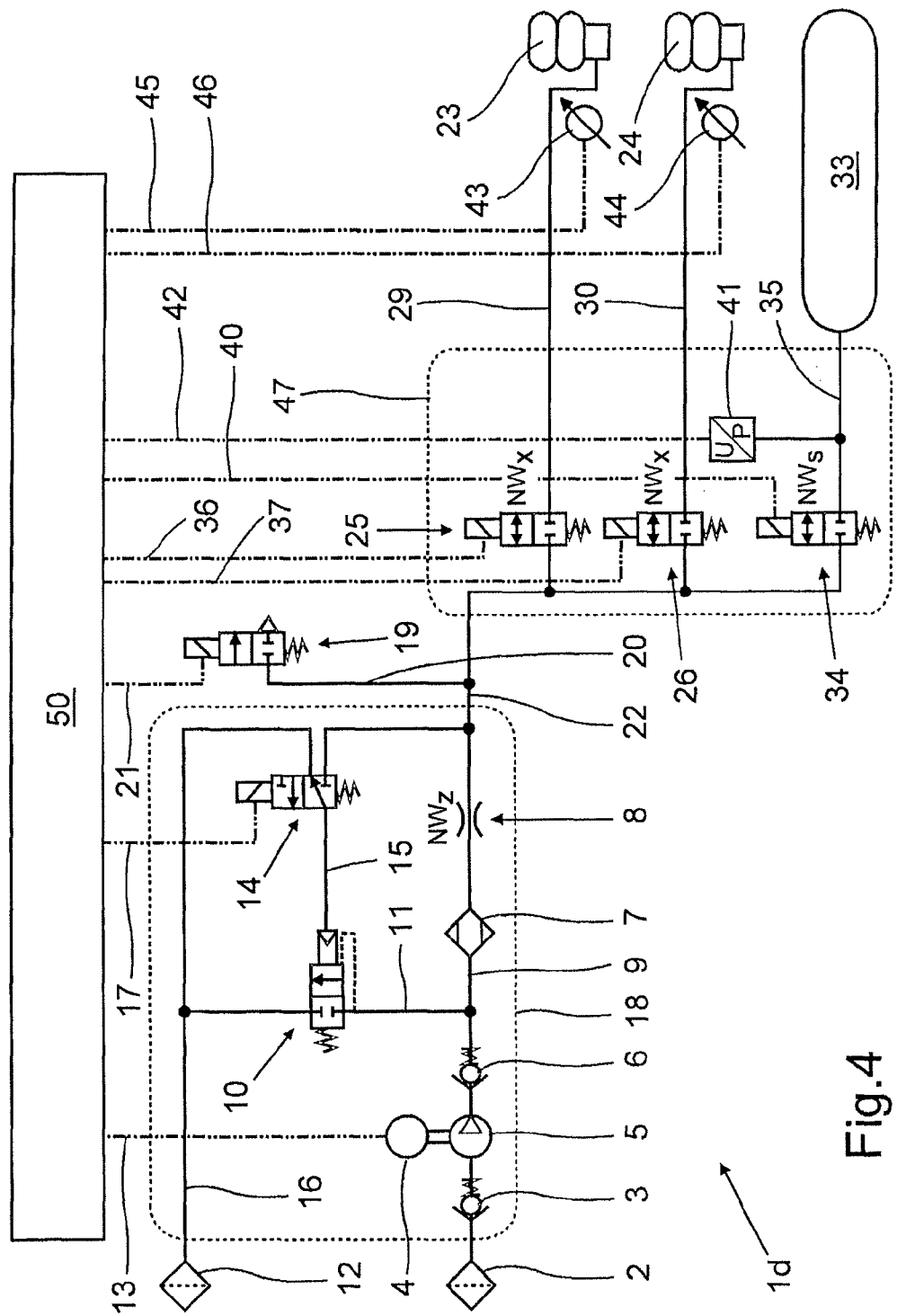
FIG. 4 shows a known second air suspension system of a motor vehicle.

To partially eliminate this disadvantage, a rapid discharge valve 19 is additionally provided in the known air suspension system 1d, which is shown in schematic form in FIG. 4 and corresponds in large part to the air suspension system 1c shown in FIG. 3. The rapid discharge valve 19 is designed as a 2/2-way solenoid switching valve, by means of which a rapid vent line 20 connected to the main pressure line 22 is blocked off in a first position (rest position) and connected to the environment in a second position (actuated position). The electromagnet of the rapid discharge valve 19 is connected by an electrical control line 21 to the control unit 50. By opening the rapid discharge valve 19, it is thus possible to allow compressed air to flow out of the main pressure line 22 and, when the level control valves 25, 26 are open, also out of the spring bellows 23, 24 into the environment, bypassing the restrictor 8, the air dryer 7, the discharge valve 10 and the filter 12, in order thereby to bring about rapid lowering of the vehicle body at the relevant vehicle axle. However, the disadvantage of this is that the compressed air that has previously been dried when the spring bellows 23, 24 were supplied with air escapes unused in this case, and, as a result, the air dryer 7 or the silicate granules in the latter are not regenerated.

In contrast, a first embodiment of an air suspension system 1a according to the invention, which is illustrated in schematic form in FIG. 1 and is based on the air suspension system 1c shown in FIG. 3, has a simple and low-cost solution for improving the controllability of the air mass flow during the supply of air to and venting of air from the air spring bellows 23, 24. For this purpose, a second connecting line 31, 32 provided with a second level control valve 27, 28 is, in each case, arranged between the main pressure line 22 and the respectively associated spring bellows 23, 24, parallel to the first connecting lines 29, 30, which are each provided with a first level control valve 25, 26.

The second level control valves 27, 28 are of substantially identical construction to the first level control valves 25, 26, being designed as 2/2-way solenoid switching valves, which are closed in a first position (rest position) and open in a second position (actuated position), in each case, with a nozzle cross-sectional area of nominal size $NW_Y$, and the electromagnets of which are connected to the control unit 50 in each case by an associated electrical control line 38, 39.

Through individual or combined opening of the level control valves 25, 27 and 26, 28, each assigned to one spring bellows 23, 24, it is thus possible to open up a plurality of nozzle cross-sectional areas and thus set different air mass flows when supplying air to and venting air from the spring bellows 23, 24.

If the first and second level control valves 25, 27 and 26, 28 are of completely identical construction and have identical nozzle cross-sectional areas or nominal sizes $NW_X$, $NW_Y$ ($NW_X = NW_Y$), it is possible, in a first operating mode, by opening just one of the two level control valves (25 or 27; 26 or 28) in each case and, in a second operating mode, by opening both level control valves (25 and 27; 26 and 28) in each case, effectively to open up two nozzle cross-sectional areas of different sizes and accordingly to set two different raising and lowering speeds of the vehicle body at the relevant vehicle axle or on the relevant vehicle side.

If, on the other hand, the first and second level control valves 25, 27 and 26, 28 have nozzle cross-sectional areas or nominal sizes $NW_X$, $NW_Y$ that are different, e.g., the nominal size $NW_X$ of the first level control valves 25, 26 is greater than the nominal size $NW_Y$ of the second level control valves 27, 28 ($NW_X > NW_Y$), it is even possible, by opening just one of the two level control valves (25 or 27; 26 or 28) in each case and by opening both level control valves (25 and 27; 26 and 28) in each case, to effectively open up three nozzle cross-sectional areas of different sizes and consequently to set three raising and lowering speeds of the vehicle body at the relevant vehicle axle or on the relevant vehicle side.

In the air suspension system 1a according to the embodiment of the invention shown in FIG. 1, the level control valves 25, 26, 27, 28, the reservoir valve 34 and the pressure sensor 41 are combined in a quintuple valve block 49 by way of example.

If, by way of example, one spring bellows 23 is arranged on the nearside of the front axle and the other spring bellows 24 is arranged on the nearside of the rear axle of a bus, the nearside vehicle body can be lowered to make it easier for passengers to get in and out by releasing the compressed air from these nearside spring bellows, and it can then be raised again by filling the spring bellows. More specifically, rapid lowering of the nearside vehicle body can be achieved by opening all the associated level control valves 25, 26, 27, 28 and venting the spring bellows 23, 24.

Subsequent raising of the nearside vehicle body, initially at a slow speed, is then achieved by supplying air to the spring bellows 23, 24 by means of those opened second level control valves 27, 28 that have the smaller nozzle cross-sectional area $NW_Y$. After raising the nearside vehicle body, initially at a slow speed, the second level control valves 27, 28 with the smaller nozzle cross-sectional area $NW_Y$ are closed, and the first level control valves 25, 26 with the larger nozzle cross-sectional area $NW_X$ are opened, resulting in the setting of a medium raising speed as the spring bellows 23, 24 are filled further. Finally, a maximum raising speed is set by opening the second level control valves 27, 28 in addition to the first level control valves 25, 26, and the spring bellows 23, 24 are supplied with air via the sum of the nozzle cross-sectional areas of all the associated level control valves 25, 26, 27, 28.

When venting the spring bellows 23, 34, lowering the nearside vehicle body at three speeds can advantageously be accomplished in the reverse sequence of the switching actuation just described of the level control valves 25, 26, 27, 28.

It is likewise possible to raise or lower the vehicle body at one vehicle axle with up to three speeds, e.g., in order to adjust the loading surface of a truck to the height of the loading ramp. This merely assumes that the spring bellows 23, 24 are arranged on both sides at the same vehicle axle.

Moreover, an air suspension system according to the invention can be provided with more than two spring bellows, wherein a plurality of spring bellows can be supplied with air or vented via two associated connecting lines, each with a level control valve arranged therein, and arranged on different vehicle axles or ends of a vehicle axle.

Figure 2:
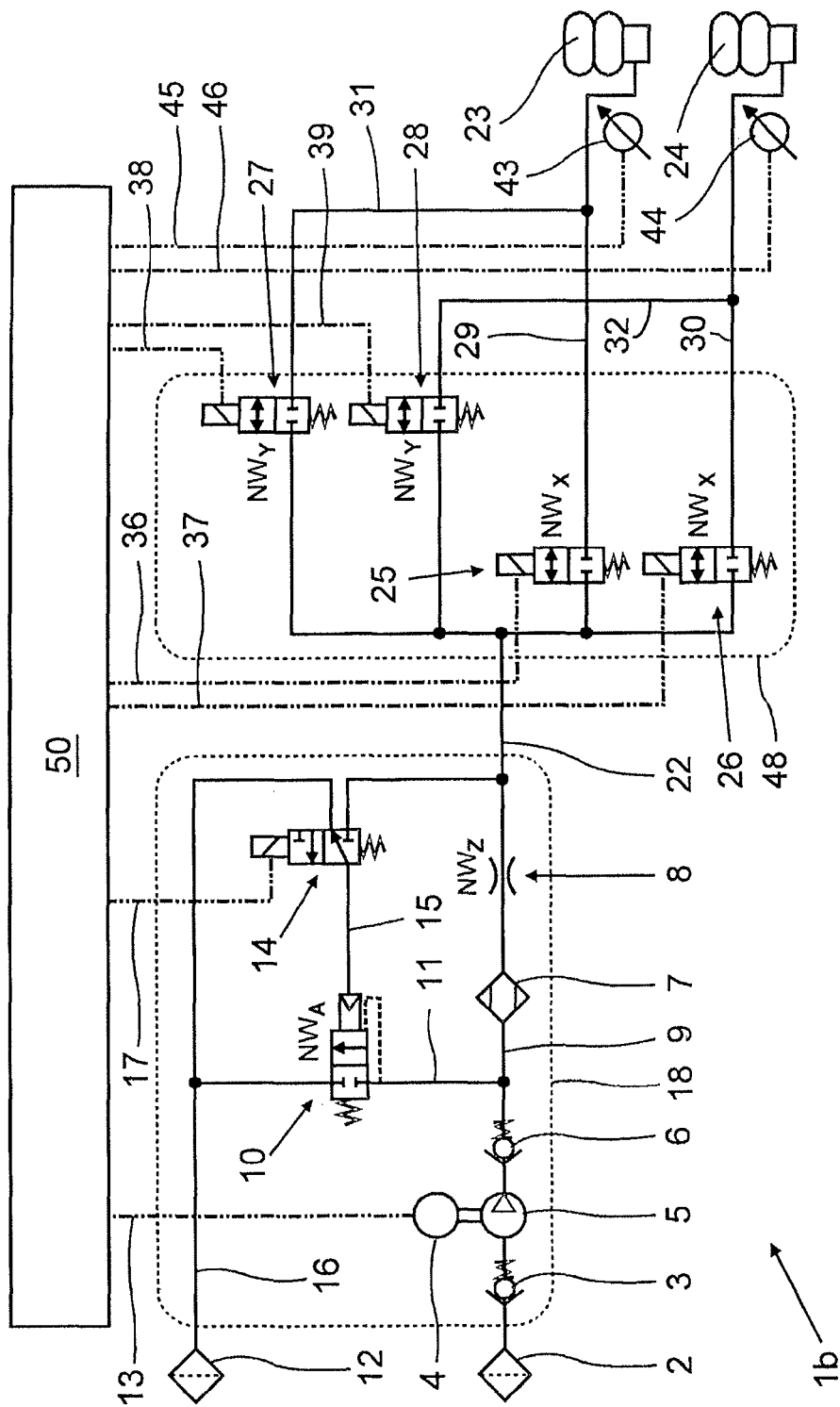
FIG. 2 shows a vehicle air suspension system according to a second embodiment of the present invention.

By virtue of the inventive improvement in the controllability of the air suspension system 1a, it is possible to dispense with the pressure reservoir 33, the associated reservoir valve 34, the pressure sensor 41 and the sensor line 42 if required. A correspondingly simplified second embodiment of the air suspension system 1b according to the invention is illustrated in schematic form in FIG. 2. Since the majority of the components of this air suspension system 1b have already been described in connection with the air suspension systems in FIGS. 1, 3 and 4, no further details thereof need be given below. By virtue of the saving of components in the air suspension system 1b shown in FIG. 2, the level control valves 25, 26, 27, 28 are now combined in a quadruple valve block 48 by way of example.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A vehicle air suspension system, comprising at least one spring bellows assigned to an air spring of at least one vehicle axle, the at least one spring bellows being one of connected to a main pressure line and blocked off with respect thereto via a connecting line having a level control valve, the main pressure line being suppliable with air via a supply line having a compressor and an air dryer, the main pressure line being ventable via a vent line between the compressor and the air dryer, the vent line having a discharge valve; and a pressure reservoir one of connected to the main pressure line and blocked off with respect thereto via a connecting line having a reservoir valve; wherein the at least one spring bellows of the air spring arranged one of at least at one vehicle axle and at least on one side of the vehicle is one of connected to the main pressure line and blocked off with respect thereto via at least two substantially parallel connecting lines, each of the at least two substantially parallel connecting lines having a level control valve.

2. The air suspension system as claimed in claim 1, wherein each level control valve of the at least two substantially parallel connecting lines has the same nozzle cross-sectional area.

3. The air suspension system as claimed in claim 1, wherein each level control valve of the at least two substantially parallel connecting lines has a different nozzle cross-sectional area.

4. The air suspension system as claimed in claim 1, wherein the level control valve of each of the at least two substantially parallel connecting lines assigned to the at least one spring bellows of a single air spring is arranged in a common valve block.

5. The air suspension system as claimed in claim 1, further comprising a restrictor downstream of the air dryer in the direction of air supply, the restrictor having a throttling cross-sectional area that is greater than a sum of nozzle cross-sectional areas of each level control valve of the at least two substantially parallel connecting lines.

\* \* \* \* \*